No. 880,799. PATENTED MAR. 3, 1908.
J. T. JONES.
METHOD OF REDUCING ORES.
APPLICATION FILED MAY 22, 1907.
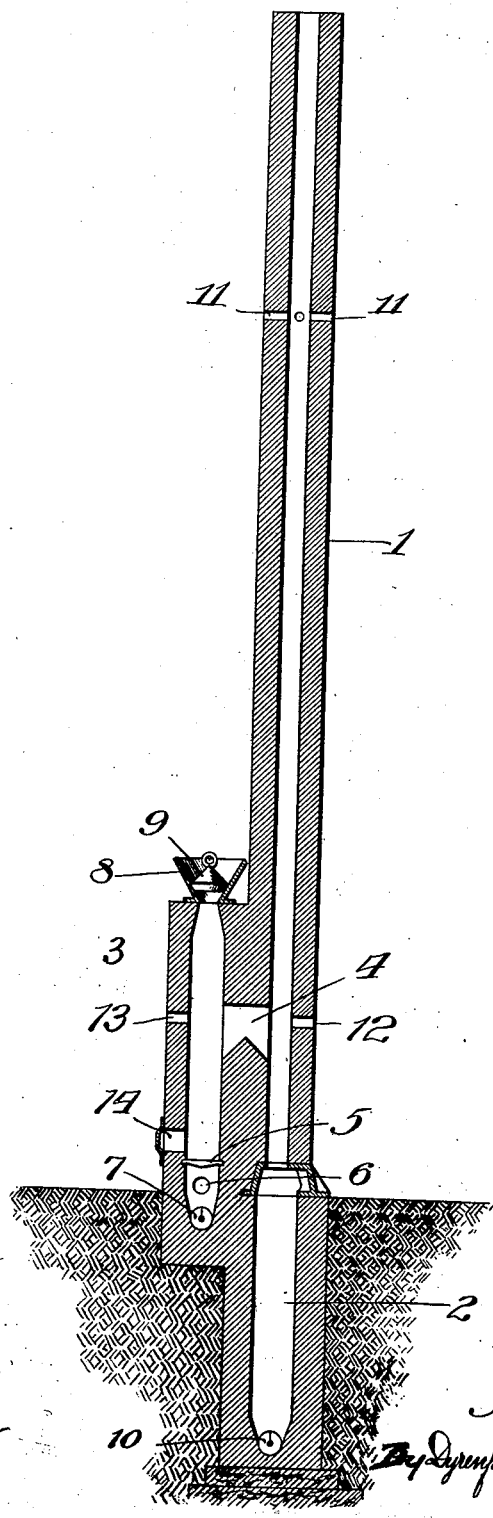

UNITED STATES PATENT OFFICE.

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF REDUCING ORES.

No. 880,799.   Specification of Letters Patent.   Patented March 3, 1908.

Application filed May 22, 1907. Serial No. 374,980.

*To all whom it may concern:*

Be it known that I, JOHN T. JONES, a citizen of the United States, residing at Iron Mountain, in the county of Dickinson and State of Michigan, have invented a new and useful Improvement in Methods of Reducing Ore, of which the following is a specification.

My invention relates to an improved method of treating ores, and more especially ores in the form of flue-dust, or in otherwise finely divided or pulverized condition, as are the Massaba ores and concentrates, my object being to reduce the oxygen in the ore, say of iron in the form of an oxid in the raw ore as it occurs in the natural product known as black-sand, and as a result of the treatment leave the iron in a metallic state.

My improved method involves mixing the fine ore preferably with coke or some other refractory substance that will remain in lump form by resisting the melting tendency of the heat of the reducing atmosphere to which the ore is subjected, thereby to render the column of the ore non-packing and sufficiently interstitial for the passage through it of the hot products of combustion; and my improved method involves exclusion of air from the ore undergoing reduction and of the admixture of lime, silica or other material that would tend to introduce impurities, as phosphorus and sulfur. After reduction the recovered metal is separated from the gangue and the lump material, which latter may be used over and over again, the separation of the metal being accomplished by any known or suitable method, as magnetic separation, or gravity separation by water, oil or air; and the metal so separated is in condition to be melted in an open-hearth furnace, or balled in an ordinary balling, puddling or scrap-furnace.

For the practice of my improved method I prefer to employ the furnace forming the subject of my copending application, Serial No. 374,981, filed concurrently herewith on the 22nd day of May, 1907, and which is shown in the accompanying drawing by a view in vertical sectional elevation.

A vertical ore-stack 1 rising from a pit 2 forming a cooling-chamber of relatively large cross-section and of considerable depth— say about twenty feet—has built upon its face a furnace 3 communicating about midway between its ends, through a flue 4, with the stack. Below a grate 5 shown to be provided in the furnace, is provided in its wall an air-blast port 6 above a conveyer, indicated at 7, for the removal of ashes; and the upwardly tapering mouth of the furnace-chamber is shown to be provided with a hopper 8 through which to introduce the fuel, the hopper containing a bell-valve 9, raising of which permits the fuel in the hopper to feed into the furnace-chamber, without opening the latter. A conveyer 10 is indicated in the base of the cooling-chamber 2; and toward the upper end of the stack it is provided with air-inlet ports 11. At 12 is shown a poker-hole in the wall of the stack, and a similar hole 13 is provided in the furnace-wall in alinement with the flue 4.

The flue-dust or other ore in finely divided condition, to be reduced, is fed into the stack from its upper end mixed with lumps preferably of coke to render the column suitably interstitial, no other material being mixed with the ore, as is the practice in smelting-furnaces, whereby the metal would be contaminated with impurities as hereinbefore mentioned.

Carbonaceous fuel is burned on the furnace-grate, the variety most suitable for my purpose containing about sixty per cent. carbon, about thirty per cent. volatile hydrocarbons and about ten per cent. ash.

The furnace is fired at the grate-bars through a suitable opening 14 equipped with closing means, and the blast is admitted through the port 6. The bed of fuel is raised to and maintained in a condition of incandescence up to about the top of the flue 4, above which the fuel is heated sufficiently to distil off its volatile hydrocarbons, which mix, in the flue 4, with the products of combustion from the incandescent portion of the bed, thereby greatly augmenting their reducing action on the ore. The products of combustion, from which all air is excluded, pass upward through the ore in the stack and reduce the oxygen in the ore, say of iron in the form of an oxid in the raw ore, leaving the iron in a metallic state. Of course, in the first part of a run of the furnace the ore in the chamber 2 will not be reduced, but will be taken out by the conveyer 10 to be again fed to the stack during the run. For that matter, for the first part of the run, the cooling-chamber and the stack up to the flue 4, could be filled with ordinary sand, to be thrown away on removing it from the chamber. The products of combustion will attain the height of the ports 11 in a more or less spent condition, when air mixing with them through the ports will promote their further combustion, thereby utilizing practically all of the heat units, for preliminarily heating the ore above the ports in the stack, from the top of which the products of combustion escape in a practically spent condition.

The coke mixed with the ore is not burned out when the air is admitted through the ports 11 because the carbonic oxid combines with the free oxygen more readily than with the fixed carbon, and as long as the carbonic oxid is there the oxygen will not attack the carbon of the coke. Of course from the ports 11 upward the oxygen of the admitted air attacks the carbonic oxid, producing $CO_2$, which still further protects the coke to the outlet from the stack, there still being a great excess of carbonic oxid escaping from the stack, which may be utilized for heating.

The ore thus reduced which attains the chamber 2 becomes cooled therein, though without exposure to the atmosphere since the chamber is closed, and as it cools it is removed from the chamber by the action of conveyer 10. The coke is separated from the ore, to be used over again in the stack, and the iron (or other metal) forming the product of reduction is then separated from the gangue, by magnetic, gravity, or other mode of separation and is in condition to be melted as hereinbefore suggested.

What I claim as new and desire to secure by Letters Patent is—

1. The method of reducing ore to recover the metal therefrom, which consists in mixing with the ore in finely divided condition coke, or the like, in lump form, thereby forming a column of the ore mixed throughout with such coke, or the like, to render the column interstitial, and passing through said column the hot products of combustion from carbonaceous fuel, to the exclusion of air and without smelting the ore, thereby reducing the metallic constituent of the ore to a metal state therein.

2. The method of reducing ore to recover the metal therefrom, which consists in mixing with the ore in finely divided condition coke, or the like, in lump form, passing through a column of the mixture the hot products of combustion from carbonaceous fuel, to the exclusion of air and without smelting the ore, and mixing air with the products of combustion in the upper part of said column, for the purpose set forth.

3. The method of reducing ore to recover the metal therefrom, which consists in mixing with the ore in finely divided condition coke, or the like, in lump form and passing through a column of the mixture the hot products of combustion from carbonaceous fuel together with hydrocarbons distilled from said fuel, to the exclusion of air and without smelting the ore, thereby reducing the metallic constituent of the ore to a metal state therein.

4. The method of reducing ore to recover the metal therefrom, which consists in mixing with the ore in finely divided condition coke, or the like, in lump form thereby forming a column of the ore mixed throughout with such coke, or the like, to render the column interstitial, passing through said column the hot products of combustion from carbonaceous fuel, to the exclusion of air and without smelting the ore, and cooling the ore thus treated preparatory to separating from the gangue the metal products of reduction.

5. The method of reducing ore to recover the metal therefrom, which consists in mixing with the ore in finely divided condition coke, or the like, in lump form, passing through a column of the mixture the hot products of combustion from carbonaceous fuel together with hydrocarbons distilled from said fuel, to the exclusion of air and without smelting the ore, cooling the ore thus treated and separating from the gangue the metal product of reduction.

JOHN T. JONES.

In presence of—
 JOHN O'HARA,
 EDWARD E. BREWSTER.